June 9, 1936.  L. C. HYATT  2,043,798

VALVE FOR BUS HEATERS

Filed Feb. 6, 1930

INVENTOR
Louis C. Hyatt
BY
E. M. Bentley
ATTORNEY

Patented June 9, 1936

2,043,798

UNITED STATES PATENT OFFICE 2,043,798

VALVE FOR BUS HEATERS

Louis C. Hyatt, Albany, N. Y., assignor to Consolidated Car-Heating Company, Inc., Albany, N. Y., a corporation of New York Application February 6, 1930, Serial No. 426,305

4 Claims. (Cl. 137—153)

Figure 1:
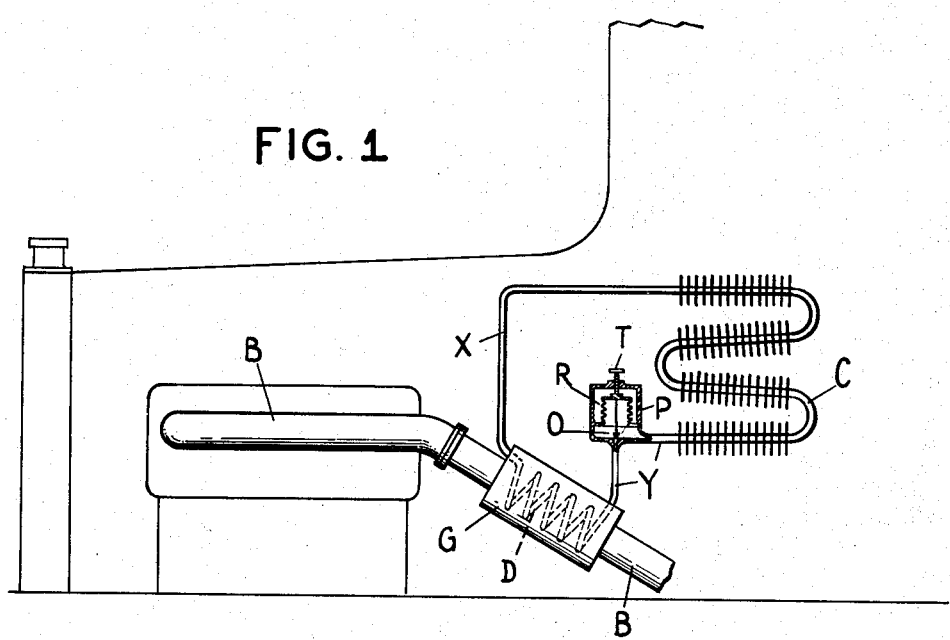
Figure 2:
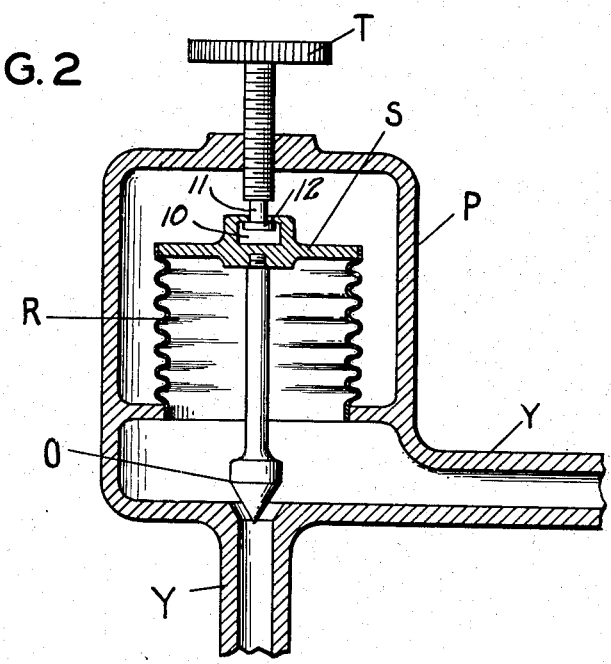

For a detailed description of the present form of my invention, reference may be had to the following specification and to the accompanying drawing forming a part thereof, wherein Fig. 1 is a diagrammatic elevation of my device, and Fig. 2 is an enlarged section of the controller.

My invention relates to a heater for a bus, or other appropriate vehicle propelled by an internal combustion engine. It has been proposed to heat such vehicles from the exhaust of the engine by introducing the exhaust gas into a radiator in the vehicle. That method is, however, not free from danger because of the possibility that said gas will escape inside the bus, and, being largely carbon monoxide, which is poisonous, will be injurious to the passengers. In the device shown I introduce the exhaust gas into an evaporator, which may be located in any safe position. In this evaporator is contained a small permanent body of water, or other evaporable liquid, which is converted into steam by the heat of the exhaust gas. This steam may be safely introduced into the vehicle, and there, by means of a condensing radiator, deliver its heat to the interior of the vehicle. Since the body of water is small—say eight ounces—in order to avoid a large weight of water, such as would be required if the water instead of steam, were made the heat-carrying medium, it becomes important to avoid leakage in the steam piping. A minute leak might quickly drain out the small body of water, particularly if it were under high internal pressure, and leave the system inoperative. For that reason it is also my present purpose to construct a sealed heating unit in which I employ a heat-controller that is sealed inside of the piping for the steam. By this means I am enabled to properly regulate the heating, by control of the flow of the condensate back into the evaporator, without the need of an external valve handle passing through the wall of the steam piping and the stuffing box which such a valve requires and which is liable to leakage at unexpected times.

Referring to the accompanying drawing, B represents the exhaust pipe of the propelling internal-combustion engine which, as usual, opens into the outside atmosphere, preferably through a muffler. At any suitable point in said pipe B, I form an enlargement G inside of which is the vaporizer D in the shape of a coiled tube serving as a boiler for which the enlargement G is the heat-box. The coil of this boiler should not obstruct the passage of the exhaust gas through the said pipe B and the interpolated heat-box G. The vaporizer D is, at one end, connected to a pipe X that leads to a condensing radiator C in the vehicle body and is connected thereto in a suitable manner. The opposite terminal of the radiator C is suitably connected by pipe Y to the opposite end of evaporator D. The said pipe Y includes a cast metal chamber P. To a flange inside of chamber P near its bottom the lower end of a corrugated drum R is brazed or otherwise secured in such manner as to provide a tightly sealed union of the parts, and a disc S is brazed or otherwise secured to the top of said drum so as to provide a tightly sealed union of the parts. An adjusting screw T is loosely swivelled to the upper face of disc S, and passes thence upward through the top of chamber P in which it has a screw-bearing. As shown, the disk S is provided with a socket 10, having one end wall loosely engaging a reduced portion 11 of the screw shank. Said reduced portion is provided with an end flange 12, and the socket is of such length that a limited movement of the end wall S with respect to said flanges, is permitted axially with respect to said screw. To the under face of disc S is secured the stem of a valve O, the valve seating in the outlet opening of pipe Y in the floor of chamber P. It will be noted that the drum R is a part of a sealed heating unit, which also includes the vaporizer, radiator and the supply and return connections, and that the valve and valve stem are completely and wholly located within the sealed unit in such manner that no leakage to the outside atmosphere is normally possible. It will also be noted that the screw T is so connected with the drum R that the valve may be manually adjusted without destroying the non-leak characteristics of the unit. By this means the corrugated drum R can, by its expansion and contraction within the limits permitted by its loose swivel connection with adjusting screw T, act to raise and lower the valve O and thereby control the outflow through pipe Y from the radiator C to the evaporator D. Yet this controlling agency for regulating the flow of the condensate from the radiator to the evaporator is permanently and hermetically connected with the line of piping made up of the evaporator coil D, the pipe X, the radiator C and pipe Y. Thus there is no opportunity for leakage out of said piping line of either the steam or the small body of water employed for producing the steam. As a heating agency for the bus the steam is effective, not by virtue of its large volume but by virtue of its high temperature which is maintained by the rapidity of the cycle of conversion from water to steam at the vaporizer and from steam to water at the radiator. The maximum limit of the heating is determined by adjusting screw T which fixes the degree to which the valve checking the back flow of condensate can be lifted by the internal steam pressure in drum R. On the other hand, by screwing T down the valve can be completely closed. That will break the cycle, and the condensate, which is of restricted volume, will then be all trapped in the radiator, leaving none in the evaporator to be reconverted into steam. From the foregoing it will be obvious that irrespective of whether or not the unit is sealed hot or cold, just as soon as the internal pressure within the unit exceeds the external pressure upon the drum R, the valve will be moved from its seat to the extent provided by any adjusted position of the screw T. Thus, if the valve is seated while the unit is cold, and the screw T has been adjusted to permit of limited upward movement, as the internal pressure increases, the valve will be moved in the unseating direction to the extent permitted by the space between the head S and the flange 12. In a similar manner, if the external pressure exceeds the internal pressure, the valve will be moved to its seat to the same extent as the distance that the head S may move along the reduced diameter 11 of the screw T. It will also be readily understood that the screw T may be adjusted so as to hold the valve to its seat or away from its seat irrespective of the pressures, because if the screw T is adjusted downwardly far enough the flange 12 will abut the bottom of the socket 10 and prevent any upward movement of the valve. In a similar manner, the screw T may be adjusted upwardly to such a point that the flange 12 will engage the upper wall of the socket 10 and prevent downward movement of the valve. Therefore, if it is desired that the valve be unseated by pressure, the screw T is adjusted to the position shown in Fig. 2. If it is desired to absolutely prevent upward movement, the screw T is adjusted so that the flange 12 abuts against the lower wall of the socket 10.

In the drawing, for purposes of illustration, the vehicle is diagrammatically shown as conforming to the conventional contour of a motor vehicle, with the radiator C located in the space back of the hood. It is to be understood, however, that the radiator may be located at any desired position within said vehicle body.

In practice, the "normal" setting of the valve O might be fully closed, fully opened or at an intermediate position, depending entirely upon the adjusted position of the screw T. If there is no steam pressure in the system, the pressure within the system could be atmospheric or less, depending upon the conditions prevailing at the time of hermetically sealing the system. For instance, if the system is sealed cold, without removing the air, the pressure within the system after sealing would be atmospheric pressure while there is no steam pressure in the system. Under this condition, the pressures inside and outside of the system would be balanced and the corrugated drum R would tend to assume its normal position. This position would be determined by the adjusted position of the screw T and the clearance between the enlargement 12 and the disk S. In this normal position of the drum R, the valve O could by design be either closed or opened, as above stated. If the valve O is to be normally closed, the drum R could be extended by the screw T to open the valve, because said drum can be extended or compressed from its normal position. On the other hand, if the valve O is normally opened, the drum R may be compressed by the screw T to close the valve O.

If the system is sealed hot (above 212° F.), so that the air inside the system has been expelled by the steam, the pressure within the system after sealing would be less than atmospheric while there is no steam pressure in the system. With the system sealed hot, the pressure within the system would be less than atmospheric after the system has cooled. Because atmospheric pressure would prevail in the space exterior to the space enclosed by the drum R and disk S, on account of the movable connection between the screw T and said disc, this atmospheric pressure on the upper face of said disk would tend to compress the drum R while there is no steam pressure within the system. However, the position of the valve O, with no pressure within the steam system would be determined by the position of the screw T, the clearance between T and S and the length of the valve stem between the valve and the disk S.

If it is desired that the valve O be closed, the screw T is screwed down and the valve O will be moved to its seat, regardless of steam pressure, and the system cools off. If it is desired that the valve be opened, screw T is adjusted reversely and the valve O is opened so that condensate can return to the evaporator D and generate steam if there is heat and temperature enough within the enlargement G of the exhaust pipe.

What I claim as new and desire to secure by Letters Patent is:

1. A valve for controlling flow of condensate in a continuous, sealed heating unit, comprising a casing having in inlet branch in the side thereof and an outlet branch in the bottom thereof, said outlet branch having a valve seat at its point of communication with said casing, an expansible and contractible pressure-responsive chamber located within said casing, said chamber having an open lower end in sealed connection with said branches so as to be subject to the pressure therein, said chamber having a top wall movable toward and from said valve seat, a tapered valve complemental to said seat and having a stem secured to the underside of said movable wall, an adjusting member supported by said casing exteriorly of said chamber, and means connecting the inner end of the adjusting member with the top side of said movable wall and including means providing for limited longitudinal movement of said last mentioned chamber wall with respect to the adjusting member.

2. A valve for controlling flow of condensate in a continuous, sealed heating unit, comprising a return connection consisting of a casing having an inlet branch in the side thereof and an outlet branch in the bottom thereof, said outlet branch having a valve seat at its point of communication with said casing, an expansible and contractible pressure-responsive chamber located within said casing and having a lower open end in sealed communication with said inlet and outlet branches so as to be subject to the pressure therein, said casing having a top wall movable toward and from said valve seat, a tapered valve complemental to said seat and having a straight stem secured to the underside of said movable wall, means providing a socket in the upper side of said movable wall, and a manually adjustable screw supported by the top wall of the casing exteriorly of said chamber and having an end located within said socket, said screw and said socket being so relatively constructed and arranged as to have limited relative movement parallel with the axis of the screw.

3. A valve for controlling flow of condensate in a continuous, sealed heating unit, comprising a return pipe connection consisting of a chamber having an inlet branch in the side thereof and a centrally located outlet branch in the bottom thereof, said outlet branch having a valve seat at the point of communication with said casing, an expansible and contractible pressure-responsive chamber located within said casing and having an open lower end secured to the wall of said casing in sealed communication with said branches so as to be subject to the pressure therein, said chamber having a top wall movable toward and from said valve seat, a valve stem having one end secured to the underside of said movable wall and provided at its other end with a valve positioned to project into said outlet branch in such manner as to cooperate with said valve seat, and adjusting means located exteriorly of said chamber and engaging said movable wall, said adjusting means including means providing for limited longitudinal movement of said movable wall with respect to the adjustable means.

4. A valve for controlling flow of condensate in a continuous, sealed heating unit, comprising a return pipe connection consisting of a casing having an inlet branch in the side thereof and a centrally located outlet branch leading from the bottom thereof, said outlet branch having a valve seat at its point of communication with said casing, said casing having an internal annular flange located above the plane of the inlet branch, an expansible and contractible pressure-responsive chamber located in said casing and having an open lower end with its edge sealed to said flange so as to be subject to the pressure from the inlet and outlet branches, said chamber having a closed top wall movable toward and from said valve seat, a valve stem having one end secured to said movable wall so as to move therewith and having a conical valve on its other end complemental to said seat, means providing a socket in the top face of said movable wall, an adjusting screw mounted in the top wall of said casing and having a reduced portion extended into said socket and also having a flange for limiting movement of the adjusting screw with respect to said top wall, the adjusting screw, valve stem and outlet branch being approximately in axial alignment with each other.

LOUIS C. HYATT.